US011782089B2

United States Patent
Khatri et al.

(10) Patent No.: US 11,782,089 B2
(45) Date of Patent: Oct. 10, 2023

(54) DETECTING AND REMEDIATING UNAUTHORIZED DEBUG SESSIONS

(71) Applicant: Dell Products, L.P., Round Rock, TX (US)

(72) Inventors: Mukund P. Khatri, Austin, TX (US); Mark A. Linebaugh, Austin, TX (US)

(73) Assignee: Dell Products, L.P., Round Rock, TX (US)

( * ) Notice: Subject to any disclaimer, the term of this patent is extended or adjusted under 35 U.S.C. 154(b) by 355 days.

(21) Appl. No.: 16/919,019

(22) Filed: Jul. 1, 2020

(65) Prior Publication Data
US 2022/0003817 A1 Jan. 6, 2022

(51) Int. Cl.
*G01R 31/3177* (2006.01)
*G06F 8/65* (2018.01)
*G06F 21/57* (2013.01)

(52) U.S. Cl.
CPC ........ *G01R 31/3177* (2013.01); *G06F 8/65* (2013.01); *G06F 21/572* (2013.01); *G06F 2221/033* (2013.01)

(58) Field of Classification Search
None
See application file for complete search history.

(56) References Cited

U.S. PATENT DOCUMENTS

| 8,601,279 | B2 * | 12/2013 | Little | G06F 11/3656 |
| | | | | 713/183 |
| 2007/0234332 | A1 * | 10/2007 | Brundridge | G06F 8/65 |
| | | | | 717/168 |
| 2017/0176530 | A1 * | 6/2017 | Cottrell | G01R 31/3177 |
| 2018/0164368 | A1 * | 6/2018 | Song | G01R 31/31701 |
| 2018/0293066 | A1 * | 10/2018 | Ali | G06F 8/656 |
| 2019/0163497 | A1 * | 5/2019 | Samuel | G06F 11/1469 |

OTHER PUBLICATIONS (Sguigna)—"Mitigating JTAG as an Attack Surface"—IEEE—(2019) (Year: 2019).*

* cited by examiner

*Primary Examiner* — April Y Blair
*Assistant Examiner* — Matthew W Wahlin
(74) *Attorney, Agent, or Firm* — Fogarty LLP

(57) ABSTRACT

IHSs (Information Handling Systems) may include connectors, such as an XDP connector, that support couplings by diagnostic tools that utilize a debugging interface that is supported by the IHS, such as JTAG interface. These connectors provide a useful debugging mechanism but may be exploited to access protected information and to install malicious software. Detecting when these debugging capabilities have been compromised is very difficult. In embodiments, a remote access controller of the IHS disables the JTAG interface prior to initialization of the IHS processor by maintaining the interface in reset state. The remote access controller does not include instructions necessary for releasing the JTAG interface from this reset state until its firmware has been updated. If the remote access controller detects debugging activity while the JTAG interface is still in a reset state, the remote access controller signals an attempt to conduct an unauthorized debug session.

20 Claims, 2 Drawing Sheets

DETECTING AND REMEDIATING UNAUTHORIZED DEBUG SESSIONS

FIELD

This disclosure relates generally to Information Handling Systems (IHSs), and more specifically, to supporting the secure administration of IHSs.

BACKGROUND

As the value and use of information continues to increase, individuals and businesses seek additional ways to process and store information. One option is an Information Handling System (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, global communications, etc. In addition, IHSs may include a variety of hardware and software components that may be configured to process, store, and communicate information and may include one or more computer systems, data storage systems, and networking systems.

In some instances, connectors that may also be referred to as ports, sockets or headers may be provided for physically coupling diagnostic and testing tools to some IHSs. Such connectors may be utilized as part of the assembly of an IHS in order to validate the correct manufacture and configuration of an IHS. Once deployed, such connectors may be utilized by administrators in order to utilize specialized diagnostic tools in identifying and repairing problems that are exhibited by an IHS. These types of connectors can provide a highly useful mechanism for debugging operations of an IHS. However, if not properly secured, such connectors may be exploited by malicious actors in order to access protected information and/or to install malicious software programs. Detecting instances when these hardware debugging capabilities of an IHS have been compromised has been demonstrated to be very difficult, thus compounding the importance of this security vulnerability.

SUMMARY

In various embodiments, remote access controllers provide management of a plurality of components of an IHS (Information Handling System), wherein the components include a processor supporting a debugging interface. Remote access controller embodiments may be configured to: maintain a first signaling pathway of the debugging interface in a reset state; determine a status of the debugging interface of the processor; and if the status indicates an active debugging interface status and the first signaling pathway remains in a reset state, signal an unauthorized debugging session. In additional embodiments, remote access controllers may be further configured to: receive a request for use of the debugging interface; receive updated firmware for operation of the remote access controller; utilize the updated firmware to release the reset state on the first signaling pathway; and signal an authorized debugging session. In additional remote access controller embodiments, the debugging interface comprises a JTAG (Joint Test Access Group) interface. In additional remote access controller embodiments, the first signaling pathway is maintained in the reset state upon initialization of the remote access controller. In additional remote access controller embodiments, initialization of the remote access controller is completed prior to initialization of the processor. In additional remote access controller embodiments, the status of the debugging interface of the processor is determined by querying a register of the processor. In additional remote access controller embodiments, contents of the register are written by the processor to indicate detected activity on the debugging interface. In additional remote access controller embodiments, the remote access controller is further configured to report a sensor output indicating whether the debugging session is authorized or unauthorized. In additional remote access controller embodiments, a remote management application monitors the sensor output status reported by a plurality of remote access controllers.

In various additional embodiments, Information Handling Systems (IHSs) include: a debugging connector that supports a debugging interface and receives a connection by a diagnostic tool; a plurality of components, each supporting the debugging interface of the debugging connector; and a remote access controller proving management of the plurality of components, wherein the remote access controller is configured to: maintain a first signaling pathway of the debugging interface in a reset state; detect a coupling of the diagnostic tool to the debugging connector; determine a debugging status for each of the plurality of components; and if the status indicates an active debugging status by any of the plurality of components and the first signaling pathway remains in a reset state, signal an unauthorized debugging session.

In additional IHS embodiments, the plurality of components supporting the debugging interface comprise one or more of: a processor, a storage controller, an I/O controller and a programmable logic device. In additional IHS embodiments, the remote access controller is further configured to: receive a request for use of the debugging interface; receive updated firmware for operation of the remote access controller; utilize the updated firmware to release the reset state on the first signaling pathway; and signal an authorized debugging session. In additional IHS embodiments, the debugging interface comprises a JTAG (Joint Test Access Group) interface. In additional IHS embodiments, the first signaling pathway is maintained in the reset state upon initialization of the remote access controller and prior to initialization of the plurality of components. In additional IHS embodiments, the debugging status for each of the plurality of components is determined by querying a register of each of the respective components. In additional IHS embodiments, upon signaling an unauthorized debug session, the remote access controller is further configured to initiate a shutdown procedure of the IHS.

In various additional embodiments, methods are provided for supporting secure hardware debugging of components of an Information Handling System (IHS), wherein the components comprise a processor supporting a JTAG (Joint Test Access Group) interface, the method comprising: maintaining, by a remote access controller of the IHS, a first signaling pathway of the JTAG interface in a reset state; determining a status of the JTAG interface of the processor; and if the status indicates an active JTAG interface status and the first signaling pathway remains in a reset state, signaling an unauthorized debugging session.

In additional embodiments, methods may further include: receiving a request for use of the JTAG interface; receiving updated firmware for operation of the remote access controller; utilizing the updated firmware of the remote access controller to release the reset state on the first signaling pathway; and signaling an authorized debugging session. In additional method embodiments, the first signaling pathway is maintained in the reset state upon initialization of the remote access controller. In additional method embodiments, initialization of the remote access controller is completed prior to initialization of the processor.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity, and have not necessarily been drawn to scale.

DETAILED DESCRIPTION

For purposes of this disclosure, an IHS may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An IHS may include Random Access Memory (RAM), one or more processing resources, such as a Central Processing Unit (CPU) or hardware or software control logic, Read-Only Memory (ROM), and/or other types of nonvolatile memory.

Additional components of an IHS may include one or more disk drives, one or more network ports for communicating with external devices as well as various I/O devices, such as a keyboard, a mouse, touchscreen, and/or a video display. An IHS may also include one or more buses operable to transmit communications between the various hardware components. An example of an IHS is described in more detail below. It should be appreciated that although certain IHSs described herein may be discussed in the context of an enterprise computing servers, other embodiments may be utilized.

Figure 1:
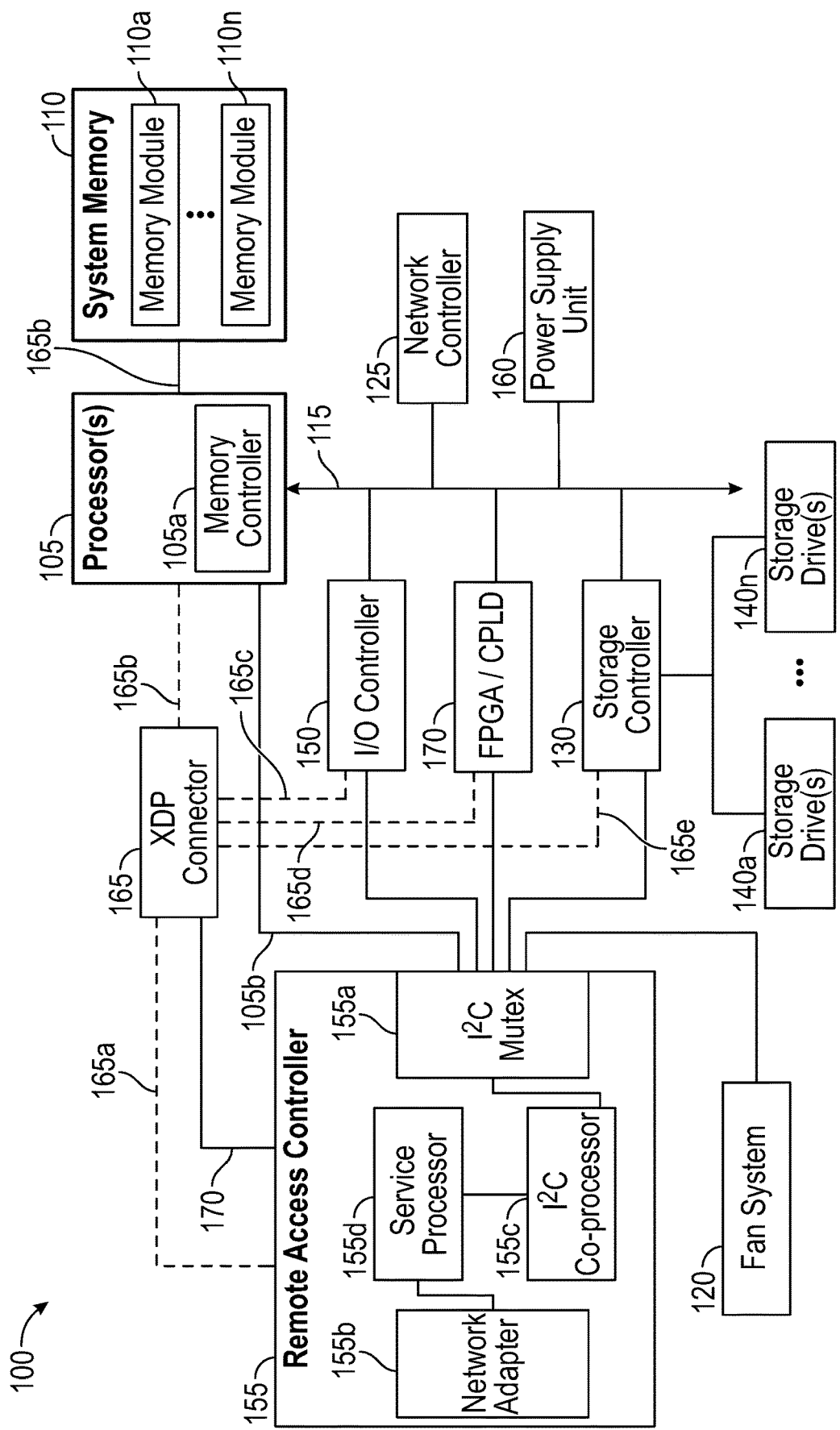
FIG. 1 is a diagram illustrating certain components of an IHS configured, according to some embodiments, for detecting and remediating unauthorized debugging sessions that utilize a debugging connector provided by the IHS.

FIG. 1 illustrates components of an IHS 100 configured according to various embodiments to implement systems and methods described herein for detecting and remediating unauthorized debugging sessions that utilize a debugging connector provided by the IHS 100. Although the embodiments provided herein describe an IHS that is a rack-mounted server, other embodiments may be implemented using other types of IHSs. In the illustrative embodiment of FIG. 1, IHS 100 may be a server that would typically be installed within a chassis, that in turn would be typically installed within slots of a rack that may be housed within a datacenter. Installed in this manner, IHS 100 may utilize certain shared resources provided by the chassis and/or rack, such as power and networking. In some embodiments, multiple servers such as IHS 100 may be installed within a single chassis. For instance, IHS 100 may be a 1 RU (Rack Unit) server that may be installed directly within a rack or may be installed within a chassis, such as a 2 RU chassis, with another 1 RU IHS server installed in the other slot of the chassis.

IHS 100 may include one or more processors 105. In some embodiments, processors 205 may include a main processor and a co-processor, each of which may include a plurality of processing cores. IHS 100 may operate using a chipset that may be implemented by integrated circuits that couple processor 105 to various other components of the motherboard of IHS 100. In some embodiments, all or portions of the chipset may be implemented directly within the integrated circuitry of an individual processor 105. The chipset may provide the processor(s) 105 with access to a variety of resources accessible via one or more buses 115. Various embodiments may utilize any number of buses to provide the illustrated pathways provided by the single illustrated bus 115. In certain embodiments, bus 115 may include a PCIe (PCI Express) switch fabric that is accessed via a root complex and serves to couple processor 101 to a variety of internal and external PCIe devices.

As described in additional detail below, processors 105 may support diagnostic operations via the use of debugging tools that are coupled to an XDP (eXtended Debug Port) connector 165. In some instances, such debugging tools that may be coupled to an XDP connector 165 provide an administrator with access to the instruction pipeline of processor 105, thus providing a powerful capability for investigating low-level operations of the processor. In some embodiments, XDP connector 165 may be a connector provided on a motherboard, midplane, backplane or other PCB (Printed Circuit Board) on which processor 105 is installed. In some embodiments, the form factor of XDP connector 165 may conform to a debugging interface supported by the manufacturer of processor 105. For instance, for some INTEL processors 105, XDP connector 165 may be a 60-pin connector that conforms to a JTAG (Joint Test Access Group) interface that specifies signaling pathways and defines instructions that may be invoked via these pathways in order to implement diagnostic procedures. Other processors may utilize JTAG-compliant interfaces that utilize significantly fewer pins. In other instances, XDP connector 165 may be conform to other form factors, such as an MIPI (Mobile Industry Processor Interface) connector or a DCI (Direct Connect Interface) connector, but may also be used to implement JTAG interfaces.

As illustrated, XDP connector 165 is coupled directly to processor 105 via signaling pathway 165b. Although illustrated as a single connection, pathway 165b is comprised of multiple motherboard traces that connect pins of the XDP connector 165 to pins of processor 105. These connections of pathway 165b that run between XDP connector 165 and processor 105 may conform to a JTAG interface. For instance, pathway 165b may include TDI (test data input), TDO (test data output), TCK (test clock), TMS (test mode select) and TRST (reset) signaling pathways. In some embodiments, various additional signaling lines may be included in pathway 165b. As described in additional detail below, in embodiments where multiple components of IHS 100 support JTAG debugging operations via XDP connector 165, the TDI and TDO signaling pathways may extend from processor 105 to each of these components, thus connecting these JTAG interface enabled components in a daisy-chain fashion.

Upon connecting diagnostic tools to XDP connector 165, the various signaling lines of pathway 165b may be utilized to retrieve data that has been made accessible to the JTAG interface by processor 105. For instance, an administrator may couple a diagnostic tool to XDP connector 165, where the diagnostic tool may retrieve data from JTAG registers supported by processor 105. Such registers may be populated with data from the instruction pipeline of processor 105. In some instances, the JTAG interface supported by processor 105 may also provide access to memory and devices that are connected to processor 105. In some instances, the JTAG interface supported by processor 105 may also include capabilities that are implemented in firmware for halting the operation of the processor, as well as for setting breakpoints that pause the operation of processor upon detecting a specified condition or upon reaching a particular instruction. Using these capabilities, administrators may be provided with powerful capabilities for testing and debugging the operations of processor 105. However, if accessed by a malicious actor, this JTAG interface of processor 105 may be used to access information stored in the processor's memory 110, alter the behavior of firmware operating on processor 105, alter the behavior of devices coupled to processor 105 and install malicious firmware for operation by processor 105. In particular, with access to the JTAG interface of processor 105, a malicious actor may utilize the XDP connector 165 to install firmware that is executed by processor 105 during booting of IHS 100. Any such malicious software operating during booting of IHS 100 may be particularly difficult to detect as it may circumvent security protocols of IHS 100 that are loaded and executed later during the boot process, or after the IHS 100 has been fully booted.

Figure 2:
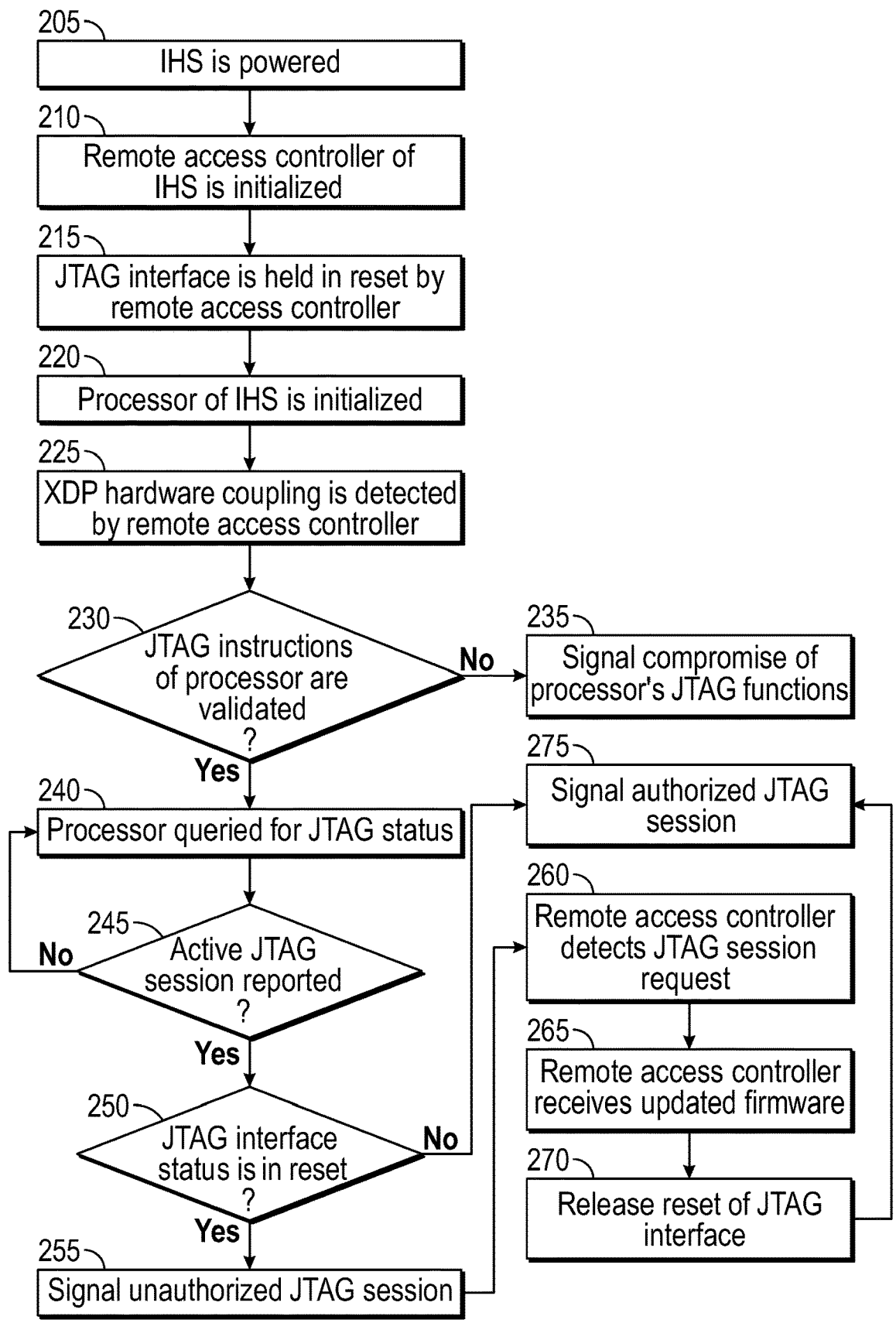
FIG. 2 is a flowchart describing certain steps of a method, according to some embodiments, for detecting and remediating unauthorized processor debugging sessions that utilize a debugging connector provided by the IHS.

As described in additional detail with regard to FIG. 2, in order to prevent unauthorized access to the JTAG interface of processor 105 via the XDP connector 165, embodiments implement procedures by which a remote access controller 155 disables the JTAG interface prior to initialization of processor 105. Remote access controller 155 maintains the JTAG interface of processor 105 in a reset state and does not include instructions necessary for releasing the JTAG interface from this reset state until the firmware of remote access controller 155 has been updated with cryptographically signed and validated instructions. If the remote access controller 155 detects JTAG debugging activity reported by processor 155 while the JTAG interface of the processor 105 is still disabled by the reset state, the remote access controller 155 signals an attempt to conduct an unauthorized JTAG debug session. In this manner, the JTAG interface of processor 105 cannot be utilized without authorization. In some embodiments, if an unauthorized debug session is detected, remote access controller 155 may initiate remediation procedures, that may include issuing alerts and shutting down power to processor 105 or shutting down IHS 100 completely.

As illustrated, processor(s) 105 may include an integrated memory controller 105a that may be implemented directly within the circuitry of the processor 105, or the memory controller 105a may be a separate integrated circuit that is located on the same die as the processor 105. The memory controller 105a may be configured to manage the transfer of data to and from the system memory 110 of the IHS 100 via a high-speed memory interface 105b. System memory 110 may include memory components, such as such as static RAM (SRAM), dynamic RAM (DRAM), NAND Flash memory, suitable for supporting high-speed memory operations by the processor(s) 105. System memory 110 may combine both persistent, non-volatile memory and volatile memory. In certain embodiments, the system memory 110 may be comprised of multiple removable memory modules. The system memory 110 of the illustrated embodiment includes removable memory modules 110a-n. Each of the removable memory modules 110a-n may utilize a form factor corresponding to a motherboard expansion card socket that receives a specific type of removable memory module 110a-n, such as a DIMM (Dual In-line Memory Module). Other embodiments of IHS system memory 110 may be configured with memory socket interfaces that correspond to different types of removable memory module form factors, such as a Dual In-line Package (DIP) memory, a Single In-line Pin Package (SIPP) memory, a Single In-line Memory Module (SIMM), and/or a Ball Grid Array (BGA) memory.

As illustrated, IHS 100 may also include a power supply unit 160 that provides the components of the chassis with appropriate levels of DC power. The power supply unit 160 may receive power inputs from an AC power source or from a shared power system that is provided by a rack within which IHS 100 may be installed. In certain embodiments, power supply unit 160 may be implemented as a swappable component that may be used to provide IHS 100 with redundant, hot-swappable power supply units. In some embodiments, power supply unit 160 may provide power to components of IHS 100 using multiple independent power planes. For instance, as described below, remote access controller 155 may be powered via a separate power plane from processor 105. In such instances, remote access controller 155 may be powered and initialized prior to powering of processor 105, thus providing opportunity for remote access controller 155 to disable capabilities of a debugging interface, such as a JTAG interface supported by XDP connector 165, prior to the initialization of processor 105. In such embodiments, remote access controller 155 may utilize a sideband interface to signal its completed initialization to power supply unit 160 so that it may provide power to the power plane utilized by processor 105.

In certain embodiments, IHS 100 may include one or more I/O controllers 110 that may each support couplings with hardware components such as user I/O devices and other external devices that may include storage devices. For instance, an I/O controller 110 may provide access to one or more user I/O devices 110, such as a keyboard, mouse, touchpad, touchscreen, microphone, speakers, or camera that may be coupled to IHS 100 via a variety of ports. Each of the supported user I/O devices may interface with I/O controller 110 through wired or wireless connections. In some embodiments, I/O controller 110 may be a USB controller that may also implement functions of a USB hub. In some embodiments, a USB controller may be a dedicated microcontroller that is coupled to the motherboard of IHS 100. In other embodiments, USB controller may be implemented as a function of another component, such as a component of a SoC of processor 105. USB controller supports communications between IHS 100 and one or more USB devices coupled to IHS 100.

As illustrated in FIG. 1, I/O controller 110 may include support for diagnostic tools coupled to XDP connector 165 and, as such, may be coupled to XDP connector 165 via signaling pathway 165c. In such embodiments, I/O controller 110 may support a debugging interface, such as a JTAG interface, that is accessible via XDP connector 165. Accordingly, in some embodiments, the signaling pathway 165c coupling I/O controller 110 and XDP connector 165 may conform to a JTAG interface and may thus include TDI, TDO, TCK, TMS and TRST signaling pathways, as well as additional signaling pathways. Although not illustrated, I/O controller 110 may additionally be daisy-chained to processor 105 and other JTAG-enabled components of IHS 100 via TDI and TDO signaling pathways. As with processor 105, I/O controller 110 may also support a debugging status register that is updated by firmware of I/O controller 100 upon detecting communications on these debugging signaling pathways. Using diagnostic tools coupled to XDP connector 165, the various signaling lines of pathway 165c may be utilized to retrieve data that has been made accessible by I/O controller 110 to the debugging interface. For instance, a diagnostic tool may be used to retrieve data from registers populated with data from the instruction pipeline of I/O controller 110. The debugging interface of I/O controller 110 may also provide access to memory and coupled devices. In some instances, the debugging interface of I/O controller 110 may also support various debugging functions. Using these capabilities, administrators may test and debug the operations of I/O controller 110. However, if accessed by a malicious actor, this debugging interface of I/O controller 110 may be used to access memory, firmware and devices coupled to I/O controller 110, as well as to install malicious firmware for operation by I/O controller 110. In scenarios where I/O controller 110 is a user device I/O controller that supports I/O devices such as a keyboard, malicious firmware installed on I/O controller 110 may be utilized as a keylogger. In scenarios where I/O controller 110 is a USB controller, malicious firmware installed on I/O controller 110 may be utilized to capture data communicated with a coupled USB device, such as a removable storage device.

As illustrated, processor(s) 105 may also be coupled to a network controller 125, such as provided by a Network Interface Controller (NIC) that is coupled to the IHS 100 and allows the IHS 100 to communicate via an external network, such as the Internet or a LAN. Network controller 125 may include various microcontrollers, switches, adapters, and couplings used to connect IHS 100 to a network, where such connections may be established by IHS 100 directly or via shared networking components and connections provided by a chassis in which IHS 100 is installed. In some embodiments, network controller 125 may allow IHS 100 to interface directly with network controllers from other nearby IHSs in support of clustered processing capabilities that utilize resources from multiple IHSs. In some embodiments, network controller 125 may be a swappable component that may be externally accessed and replaced while IHS 100 remains operational.

IHS 100 may include one or more storage controllers 130 that may be utilized to access storage drives 140a-n that are accessible via the chassis in which IHS 100 is installed. Storage controllers 130 may provide support for RAID (Redundant Array of Independent Disks) configurations of logical and physical storage drives 140a-n. In some embodiments, storage controller 130 may be an HBA (Host Bus Adapter) that provides more limited capabilities in accessing physical storage drives 140a-n. In many embodiments, storage drives 140a-n may be replaceable, hot-swappable storage devices that are installed within bays provided by the chassis in which IHS 100 is installed. In some embodiments, storage drives 140a-n may also be accessed by other IHSs that are also installed within the same chassis as IHS 100. Although a single storage controller 130 is illustrated in FIG. 1, IHS 100 may include multiple storage controllers that may operate similarly to storage controller 130. In embodiments where storage drives 140a-n are hot-swappable devices that are received by bays of chassis, the storage drives 140a-n may be coupled to IHS 100 via couplings between the bays of the chassis and a midplane or backplane 145 of IHS 100. Storage drives 140a-n may include SAS (Serial Attached SCSI) magnetic disk drives, SATA (Serial Advanced Technology Attachment) magnetic disk drives, solid-state drives (SSDs) and other types of storage drives in various combinations.

As illustrated in FIG. 1, storage controller 130 may include support for diagnostic tools coupled to XDP connector 165 and, as such, may be coupled to XDP connector 165 via signaling pathway 165e. In such embodiments, storage controller 130 may support a debugging interface, such as a JTAG interface, that is accessible via XDP connector 165. Accordingly, in some embodiments, the signaling pathway 165e coupling storage controller 130 and XDP connector 165 may conform to a JTAG interface and may thus include TDI, TDO, TCK, TMS and TRST signaling pathways, as well as additional signaling pathways. Although not illustrated, storage controller 130 may additionally be daisy-chained to processor 105 and other JTAG-enabled components of IHS 100 via TDI and TDO signaling pathways. As with processor 105, storage controller 130 may also support a debugging status register that is updated by firmware of storage controller 130 upon detecting communications on these debugging signaling pathways. Using diagnostic tools coupled to XDP connector 165, the various signaling lines of pathway 165e may be utilized to retrieve data that has been made accessible by storage controller 130 to the debugging interface. For instance, a diagnostic tool may be used to retrieve data from registers populated with data from the instruction pipeline of storage controller 130. The debugging interface of storage controller 130 may also provide access to memory and coupled devices. In some instances, the debugging interface of storage controller 130 may also support various debugging functions. Using these capabilities, administrators may test and debug the storage operations implemented by storage controller 130. However, if accessed by a malicious actor, this debugging interface of storage controller 130 may be used to access memory, firmware and devices coupled to storage controller 130, as well as to install malicious firmware for operation by storage controller 130. As such, malicious firmware installed on storage controller 130 may be utilized to capture data communicated with the storage drives 140a-n that are managed by storage controller 130.

IHS 100 may include one or more programmable logic devices 170, such as FPGA (Field-Programmable Gate Array) card(s) and/or CPLD (Complex Programmable Logic Device) cards. Each of the programmable logic devices 170 supported by IHS 100 may include various processing and memory resources, in addition to integrated circuits that may be reconfigured after deployment of IHS 100 through programming functions supported by the logic devices 170. Each individual programmable logic device 170 may be optimized to perform specific processing tasks, such as specific signal processing, security, data mining, and artificial intelligence functions, and/or to support specific hardware coupled to IHS 100. As illustrated, a programmable logic device 170 may include an in-band interface via which the programmed functions of device are utilized by processor 105. This in-band interface may also support functions for re-programming the capabilities of logic device 170. Also as illustrated, programmable logic device 170 also includes a sideband interface that is used to support monitoring and management capabilities implemented by remote access controller 155. Via this sideband interface, remote access controller may implement procedures for monitoring the operation of the programmable logic device 170, such as monitoring temperature, power consumption and performance metrics of the logic device. In some instance, reprogramming capabilities of the programmable logic device 170 may also be supported via this sideband interface.

As illustrated in FIG. 1, programmable logic device 170 may include support for diagnostic tools coupled to XDP connector 165 and, as such, may be coupled to XDP connector 165 via signaling pathway 165*d*. In such embodiments, programmable logic device 170 may support a debugging interface, such as a JTAG interface, that is accessible via XDP connector 165. Accordingly, in some embodiments, the signaling pathway 165*d* coupling the programmable logic device 170 and XDP connector 165 may conform to a JTAG interface and may thus include TDI, TDO, TCK, TMS and TRST signaling pathways, as well as additional signaling pathways. Although not illustrated, programmable logic device 170 may additionally be daisy-chained to processor 105 and other JTAG-enabled components of IHS 100 via TDI and TDO signaling pathways. As with processor 105, programmable logic device 170 may also support a debugging status register that is updated by firmware of programmable logic device 170 upon detecting communications on these debugging signaling pathways. Using diagnostic tools coupled to XDP connector 165, the various signaling lines of pathway 165*d* may be utilized to retrieve data that has been made accessible by programmable logic device 170 to the debugging interface. For instance, a diagnostic tool may be used to retrieve data from registers populated with data from the instruction pipeline of programmable logic device 170. The debugging interface of programmable logic device 170 may also provide access to memory and coupled devices. In some instances, the debugging interface of programmable logic device 170 may also support various debugging functions. Using these capabilities, administrators may test and debug the operations of programmable logic device 170. However, if accessed by a malicious actor, this debugging interface of programmable logic device 170 may be used to access memory, firmware and devices coupled to programmable logic device 170, as well as to install malicious firmware for operation by programmable logic device 170. In scenarios where programmable logic device 170 is used in implementing security protocols, unauthorized debugging sessions can potentially circumvent these security protocols entirely, while also generating outputs that falsely indicate the security protocols are operating as intended.

As illustrated, IHS 100 includes a remote access controller (RAC) 155 that provides capabilities for remote monitoring and management of various aspects of the operation of IHS 100. In support of these monitoring and management functions, remote access controller 155 may utilize both in-band and sideband (i.e., out-of-band) communications with various internal components of IHS 100. Remote access controller 155 may be installed on the motherboard of IHS 100 or may be coupled to IHS 100 via an expansion slot provided by the motherboard. As a non-limiting example of a remote access controller, the integrated Dell Remote Access Controller (iDRAC) from Dell® is embedded within Dell PowerEdge™ servers and provides functionality that helps information technology (IT) administrators deploy, update, monitor, and maintain servers remotely.

As described, In some embodiments, remote access controller 155 may operate from a different power plane from the processors 105, storage drives 140*a-n* and other components of IHS 100, thus allowing the remote access controller 155 to operate, and management tasks to proceed, while the processing cores of IHS 100 are powered off. Various BIOS functions, including launching the operating system of the IHS 100, may be implemented by the remote access controller 155. In some embodiments, the remote access controller 155 may perform various functions to verify the integrity of the IHS 100 and its hardware components prior to initialization of the IHS 100 (i.e., in a bare-metal state).

Remote access controller 155 may include a service processor 155*d* or specialized microcontroller, that operates management software that supports remote monitoring and administration of IHS 100. In support of remote monitoring functions, network adapter 155*b* may support connections between remote administrative operations and remote access controller 155, where these administrative connections may be supported via wired and/or wireless network connections. In some instances, the network connectivity provided by network adapter 155*b* may support communications with nearby remote access controllers operating in support of nearby IHSs, such as in adjacent rack-mounted servers.

The service processor 155*d* of the remote access controller 155 may rely on an 120 co-processor 155*c* to implement 120 communications with the managed components of the IHS 100. The 120 co-processor 155*c* may be a specialized co-processor or micro-controller that is configured to interface via a sideband 120 bus interface with the managed hardware systems of the IHS 100, such as I/O controller 150, storage controller 130, FPGA/CPLDs 170, fan system 120 and power supply unit 160. As illustrated, the 120 co-processor 155*c* may interface with the individual managed systems via a sideband buses selected through the operation of an I2C multiplexer 155*a*.

As illustrated in FIG. 1, remote access controller 155 may include support for diagnostic tools coupled to XDP connector 165 and, as such, may be coupled to XDP connector 165 via signaling pathway 165*a*. In such embodiments, remote access controller 155 may support a debugging interface, such as a JTAG interface, that is accessible via XDP connector 165. Accordingly, in some embodiments, the signaling pathway 165*a* coupling remote access controller 155 and XDP connector 165 may conform to a JTAG interface and may thus include TDI, TDO, TCK, TMS and TRST signaling pathways, as well as additional signaling pathways. Although not illustrated, remote access controller 155 may additionally be daisy-chained to processor 105 and other JTAG-enabled components of IHS 100 via TDI and TDO signaling pathways. Using diagnostic tools to XDP connector 165, the various signaling lines of pathway 165*a* may be utilized to retrieve data that has been made accessible by remote access controller 155 to the debugging interface. For instance, a diagnostic tool may be used to retrieve data from registers populated with data from the instruction pipeline of remote access controller 155. The debugging interface of remote access controller 155 may also provide access to memory and coupled devices. In some instances, the debugging interface of remote access controller 155 may also support various debugging functions. Using these capabilities, administrators may test and debug the operations of remote access controller 155. However, if accessed by a malicious actor, this debugging interface of remote access controller 155 may be used to access memory, firmware and devices coupled to remote access controller 155, as well as to install malicious firmware for operation by remote access controller 155.

As illustrated, remote access controller 155 may interface directly with processor 105 via signaling pathway 105b. In this illustrated embodiment, this signaling pathway 105b is an 120 pathway selected via the operation multiplexer 155a. In some embodiments, signaling pathway 105b may support PECI (Platform Environmental Control Interface) communication that allow remote access controller 155 to communicate with processor 105. As described in additional detail below, remote access controller may utilize signaling pathway 105b to query registers of processor 105 in order to determine whether processor 105 is reporting debugging activity. For instance, in some embodiments, processor 105 may be configured to set a model-specific register (MSR) upon detecting JTAG interface communications on any of the TDI, TDO, TCK or TMS signaling pathways with XDP connector 165. In this same manner, in embodiments were additional components of IHS 100 support the JTAG interface accessed via XDP connector 165, remote access controller may utilize sideband interfaces for querying the hardware registers of these components that are updated to reflect detected JTAG debugging communications.

Also as illustrated in FIG. 1, remote access controller 155 may include a signaling pathway 170 by which the XDP connector 165 may be accessed outside of the JTAG debugging interface. Via this pathway 170, remote access controller 155 may detect a diagnostic tool being coupled to XDP connector 165. Upon detecting such a coupling to XDP connector 165, remote access controller 155 may utilize pathway 105b to determine whether debugging activity has been detected by processor 105, where detected debugging activity may be reflected in a register of processor 105 that is dedicated to reporting such debugging status information. As described in additional detail below, remote access controller 155 may additionally utilize pathway 170 to XDP connector 165 to drive a reset signal of the debugging interface supported by XDP connector. For instance, where the supported debugging interface is a JTAG interface, remote access controller 155 may utilize pathway 170 to hold the TRST signal pathway of the JTAG interface in a reset condition. In such embodiments, the logic supporting XDP connector 165 may be implemented in a manner that prevent diagnostic tools coupled to XDP connector 165 from blocking or otherwise precluding remote access controller 155 from holing the TRST line in this reset condition. With the TRST line held in the reset condition, remote access controller 155 may effectively disable the JTAG interface on processor 105, as well as on the other components 155, 150, 170, 130 that support the JTAG interface. With the TRST line held in a reset condition, the remote access controller 155 may signal an unauthorized debug session has been detected if querying the debug status register of processor 105, or any other JTAG-enabled component, indicates that debug activity has been detected.

In various embodiments, an IHS 100 does not include each of the components shown in FIG. 1. In various embodiments, an IHS 100 may include various additional components in addition to those that are shown in FIG. 1. Furthermore, some components that are represented as separate components in FIG. 1 may in certain embodiments instead be integrated with other components. For example, in certain embodiments, all or a portion of the functionality provided by the illustrated components may instead be provided by components integrated into the one or more processor(s) 105 as a systems-on-a-chip.

FIG. 2 is a flowchart describing certain steps of a method, according to some embodiments, for detecting and remediating unauthorized processor debugging sessions that utilize a debugging connector provided by the IHS. Embodiments may begin at block 205 with an IHS, such as the server IHS of FIG. 1, being powered. As described, an IHS may include a remote access controller that implements a variety of monitoring and management functions. Also as described, a remote access controller may be powered from a power plane that is separate from the power plane utilized by the main processor of an IHS. Accordingly, upon powering of an IHS, at block 210, the power supply unit of the IHS may enable the power plane of the remote access controller, while deferring enabling the power plane of the processor until the remote access controller has been initialized.

As described, a debugging interface, such as a JTAG interface, supported by an IHS component may include several signaling pathways that couple an XDP connector to that component. In embodiments where multiple components of an IHS support a JTAG interface, additional JTAG signaling pathways may connect these components together to form a JTAG chain. One of the signaling pathways that couple an XDP connector to each of components may include a reset line by which reset signals may be communicated to each of the JTAG enabled components. As described with regard to FIG. 1, remote access controller 155 includes capabilities for configuring certain outputs of XDP connector 165. In particular, a remote access controller may hold a particular output on a reset line that is supported by XDP connector. For instance, at block 215, the remote access controller may hold the TRST line of a JTAG interface supported by an XDP connector in a reset condition.

With the JTAG interface held in a reset state, the remote access controller may signal the power supply unit of the IHS to continue IHS initialization procedures. Accordingly, at block 220, the processor of the IHS may then be powered and initialized, which may include loading and booting of an operating system by the processor. The initialization of the processor may include various security protocols that validate the integrity of the hardware of the IHS and enforce various restrictions limiting access to certain protected components of the IHS. As described above, malicious actors that exploit the capabilities of the JTAG interface may be able to load malicious code that causes the processor to circumvent such security procedures. Embodiments prevent such misuse of a processor's JTAG interface through delaying initialization of the processor until the remote access controller has taken control of the reset line of the JTAG interface as described.

As described with regard to FIG. 1, a remote access controller may include capabilities for interfacing with the logic that supports an XDP connector. Using such capabilities, at block 225, the remote access controller may detect when a device has been coupled to an XDP connector. In some embodiments, the remote access controller may only be able to detect that a device has been coupled to the XDP connector, while other embodiments may include the ability for the remote access controller to identify a particular diagnostic tool that has been coupled to an XDP connector. Once the remote access controller detects a coupling to the XDP connector, the remote access controller may begin monitoring for a JTAG debug session reported by processor. However, some embodiments may first validate the integrity of the JTAG debug status reporting instructions utilized by the processor in order to mitigate the risk that these instructions have been corrupted and modified to falsely report that no JTAG debug session is detected. Accordingly, at block 230, the JTAG debug session reporting instructions of the processor are validated. In some embodiments, these instructions may be validated by performing a measurement calculation on these instructions and comparing the results of this measurement against the reference measurement. If such a comparison indicates that the JTAG reporting instructions of processor have been compromised, at block 235, the remote access controller may generate a signal or error indicating this condition.

If the JTAG reporting instructions of the processor are successfully validated, at block 240, the processor may be queried for its JTAG debugging status. As described with regard to FIG. 1, some processors may maintain a register, such as a model-specific register (MSR), that is updated to indicate when JTAG debugging communications have been detected. In some embodiments, the processor may update such a register upon detecting signals on the JTAG signaling pathways that couple the processor to the XDP connector. For instance, the processor may detect test data transmitted on a TDI line of the JTAG interface, data being read via a TDO line of the JTAG interface, and/or testing mode configurations transmitted on a TMS line of the JTAG interface. Based on detecting such signals or other signals being transmitted on signaling pathways between the XDP connector and the JTAG interface of the processor, the processor may update a register to indicate that a JTAG debugging session has been detected. At block 240, the remote access controller may query this register of the processor, such as via a PECI processor interface that is accessible by the remote access controller. If, at block 245, no JTAG debug session is indicated, the remote access controller continues to periodically query the processor for any updates to this register.

However, if these queries by the remote access controller indicate that a JTAG debug session has been detected by the processor, at block 250, the remote access controller confirms that the JTAG interface is still held in reset. If the JTAG interface is held in reset, the remote access controller has detected an unauthorized JTAG debug session. At block 255, the remote access controller issues a signal indicating this unauthorized JTAG debug session. As described in additional detail below, various remediation procedures may be initiated upon detecting an unauthorized JTAG session In some embodiments, the remote access controller may be configured to report this JTAG debug status as a sensor output that may be monitored remotely by centralized management tools that monitor sensor outputs generated by remote access controllers deployed throughout a datacenter. If, however, at block 250, the remote access controller determines the JTAG interface is not in a reset condition, at block 275, a notification may be issued that indicates an authorized JTAG debug session.

Even though an unauthorized JTAG debug session may be initially indicated based on the reset condition of the JTAG interface, an administrator may initiate procedures for instantiating a legitimate JTAG debug session. At block 260, the remote access controller may detect such a request. For instance, remote access controller may detect an authenticated request for a JTAG debug session, where the request may be authenticated based on credentials provided by the administrator and/or based on validation of the diagnostic tools that have been coupled to the XDP connector. In some instances, an administrator may instead issue such a request prior to coupling a diagnostic tool to XDP connector. In conjunction with an authenticated request, at block 265, the remote access controller may receive updated firmware that is cryptographically signed. Once the integrity of this updated firmware has been validated, the remote access controller updates its operating instructions using this received firmware update. Through the operation of this updated firmware, at block 270, the remote access controller releases the reset condition on the JTAG interface. With this reset condition released, the authorized JTAG debugging session may be commenced.

Once the authorized JTAG debug session has been completed, the firmware of the remote access controller may be reverted to its prior state. Based on this reverted firmware, the remote access controller again holds the JTAG interface in a reset state, thus signaling that any subsequent detected JTAG debug sessions are not authorized. In this manner, the remote access controller prevents malicious actors from surreptitiously initiating JTAG debug sessions. Moreover, these monitoring functions implemented by the remote access controller cannot be circumvented without compromising the remote access controller in a manner that forces it to operate using corrupted firmware instructions, thus further precluding the ability of a malicious actor to successfully initiate a JTAG debug session.

As described with regard to FIG. 1, in some embodiments, multiple components of an IHS may support a JTAG debug interface supported by XDP connector 165, in addition to the processor of the IHS. In such embodiments, the remote access controller may implement similar procedures as described with regard to detecting unauthorized processor debug sessions for detecting unauthorized debug sessions that are attempting to access these additional JTAG-enabled components. In particular, the remote access controller accesses the logic of the XDP connector to hold the TRST lines of each of these components in a reset condition. With the JTAG debugging functions of each of these components held in a reset condition, the remote access controller may detect a coupling of a diagnostic tool to the XDP connector. Upon detecting such a coupling, the remote access controller may confirm the integrity of the firmware used by each of the components to detect and report detected debugging communications. If this firmware is validated, the remote access controller may query the components in order to determine if any of these components has detected debugging activity. As described with regard to FIG. 1, each of these components may implement a register that is used to report any detected JTAG debugging activity. If the remote access controller receives a report of JTAG debugging activity by any of these components while the JTAG interface is still in a reset state, the remote access controller may signal the detection of an unauthorized debug session.

Upon detecting an unauthorized debug session, the remote access controller may initiate remediation procedures for alerting an administrator of the unauthorized debug session. As described, a remote access controller may provide a sensor output that reports the status of detected debug sessions as being authorized or unauthorized. Centralized management tools utilized within a data center and/or within an enterprise computing network may monitor such sensor outputs and may issue notifications to administrators upon detecting a sensor indication of an unauthorized debug sessions. However, the gravity of such unauthorized debug sessions may warrant additional actions by remote access controller. In some embodiments, detection of an unauthorized debug session may result in remote access controller initiating procedures for removing the IHS from all clusters or other workload pools. Remote access controller may also attempt to further isolate the IHS by disconnecting all network connections and connections to remote resources. In some embodiments, detection of an unauthorized debug session may result in remote access controller issuing commands to the power supply unit of the IHS to initiate procedures for shutting down the IHS. Where an unauthorized debug session is detected by a component other than the processor, remote access controller may initiate procedures for shutting down this particular component.

It should be understood that various operations described herein may be implemented in software executed by processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

The terms "tangible" and "non-transitory," as used herein, are intended to describe a computer-readable storage medium (or "memory") excluding propagating electromagnetic signals; but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. A remote access controller providing remote management of a plurality of components of an IHS (Information Handling System), wherein the components comprise a processor supporting a debugging interface, wherein the remote access controller is configured to:
   hold an output on a first signaling pathway of the debugging interface in order to maintain the first signaling pathway in a reset state, wherein the reset state of the first signaling pathway is released by the remote access controller and use of the first signaling pathway is restored upon an update to the firmware of the remote access controller;
   determine a status of the debugging interface of the processor; and
   if the status indicates an active debugging interface status and the first signaling pathway remains in a reset state due to the output still being held on the first signaling pathway, signal an unauthorized debugging session.

2. The remote access controller of claim 1, wherein the remote access controller is further configured to:
   while the signal is driven on the first signaling pathway such that the debugging interface comprises a reset state, receive a request for use of the debugging interface;
   while the signal is driven on the first signaling pathway such that the debugging interface comprises a reset state, receive updated firmware for operation of the remote access controller;
   utilize the updated firmware to release the reset state on the first signaling pathway; and
   signal an authorized debugging session.

3. The remote access controller of claim 2, wherein the remote access controller is further configured to report a sensor output indicating whether the debugging session is authorized or unauthorized.

4. The remote access controller of claim 3, wherein a remote management application monitors the sensor output status reported by a plurality of remote access controllers.

5. The remote access controller of claim 1, wherein the debugging interface comprises a JTAG (Joint Test Access Group) interface.

6. The remote access controller of claim 1, wherein the signal is driven on the first signaling pathway and is maintained in the reset state upon initialization of the remote access controller.

7. The remote access controller of claim 6, wherein initialization of the remote access controller is completed prior to initialization of the processor.

8. The remote access controller of claim 1, wherein the status of the debugging interface of the processor is determined by querying a register of the processor.

9. The remote access controller of claim 8, wherein contents of the register are written by the processor to indicate detected activity on the debugging interface.

10. An Information Handling System (IHS) comprising:
    a debugging connector that supports a debugging interface and receives a connection by a diagnostic tool;
    a plurality of components, each supporting the debugging interface of the debugging connector; and
    a remote access controller proving management of the plurality of components, wherein the remote access controller is configured to:
        hold an output on a first signaling pathway of the debugging interface in order to maintain the first signaling pathway in a reset state, wherein the reset state of the first signaling pathway is released by the remote access controller and use of the first signaling pathway is restored upon an update to the firmware of the remote access controller;

detect a coupling of the diagnostic tool to the debugging connector;

determine a debugging status for each of the plurality of components; and if the status indicates an active debugging status by any of the plurality of components and the first signaling pathway remains in a reset state due to the output still being held on the first signaling pathway, signal an unauthorized debugging session.

11. The IHS of claim 10, wherein the plurality of components supporting the debugging interface comprise one or more of: a processor, a storage controller, an I/O controller and a programmable logic device.

12. The IHS of claim 10, wherein the remote access controller is further configured to:

while the signal is driven on the first signaling pathway such that the debugging interface comprises a reset state, receive a request for use of the debugging interface;

while the signal is driven on the first signaling pathway such that the debugging interface comprises a reset state, receive updated firmware for operation of the remote access controller;

utilize the updated firmware to release the reset state on the first signaling pathway; and signal an authorized debugging session.

13. The IHS of claim 10, wherein the debugging interface comprises a JTAG (Joint Test Access Group) interface.

14. The IHS of claim 10, wherein the signal is driven on the first signaling pathway and is maintained in the reset state upon initialization of the remote access controller and prior to initialization of the plurality of components.

15. The IHS of claim 10, wherein the debugging status for each of the plurality of components is determined by querying a register of each of the respective components.

16. The IHS of claim 10, wherein, upon signaling an unauthorized debug session, the remote access controller is further configured to initiate a shutdown procedure of the IHS.

17. A method for supporting secure hardware debugging of components of an Information Handling System (IHS), wherein the components comprise a processor supporting a JTAG (Joint Test Access Group) interface, the method comprising:

holding, by a remote access controller of the IHS, an output on a first signaling pathway of the JTAG interface in order to maintain the JTAG interface in a reset state, wherein the reset state of the first signaling pathway is released by the remote access controller and use of the first signaling pathway is restored upon an update to the firmware of the remote access controller;

determining a status of the JTAG interface of the processor; and if the status indicates an active JTAG interface status and the first signaling pathway remains in a reset state due to the output still being held on the first signaling pathway, signaling an unauthorized debugging session.

18. The method of claim 17, further comprising:

while the signal is driven on the first signaling pathway such that the debugging interface comprises a reset state, receiving a request for use of the JTAG interface;

while the signal is driven on the first signaling pathway such that the debugging interface comprises a reset state, receiving updated firmware for operation of the remote access controller;

utilizing the updated firmware of the remote access controller to release the reset state on the first signaling pathway; and signaling an authorized debugging session.

19. The method of claim 17, wherein the signal is driven on the first signaling pathway and is maintained in the reset state upon initialization of the remote access controller.

20. The method of claim 10, wherein initialization of the remote access controller is completed prior to initialization of the processor.

* * * * *